United States Patent [19]
Preller

[11] Patent Number: 5,995,388
[45] Date of Patent: Nov. 30, 1999

[54] SWITCHED-MODE POWER SUPPLY WITH LOW POWER LOSS STANDBY OPERATION

[75] Inventor: Peter Preller, München, Germany

[73] Assignee: Siemens Aktiengesellschaft, Munich, Germany

[21] Appl. No.: 09/114,736

[22] Filed: Jul. 13, 1998

Related U.S. Application Data

[63] Continuation of application No. PCT/DE96/02416, Dec. 16, 1996.

[51] Int. Cl.$^6$ ................................................ H02M 3/335
[52] U.S. Cl. ................................................................ 363/21
[58] Field of Search ................................. 363/21, 72, 95, 363/97, 131

[56] References Cited

U.S. PATENT DOCUMENTS

| | | |
|---|---|---|
| 4,481,429 | 11/1984 | Christopher . |
| 5,189,600 | 2/1993 | Keck et al. . |
| 5,453,921 | 9/1995 | Shutts ........................................ 363/21 |
| 5,812,383 | 9/1998 | Majid et al. ............................... 363/21 |

FOREIGN PATENT DOCUMENTS

| | | |
|---|---|---|
| 0 106 041 A1 | 9/1982 | European Pat. Off. . |
| 32 25 942 A1 | 1/1987 | Germany . |
| 33 27 003 C2 | 6/1992 | Germany . |
| 44 03 731 C1 | 6/1995 | Germany . |
| 4-35487 | 2/1992 | Japan . |

OTHER PUBLICATIONS

Patent Abstracts of Japan No.1 07–308065 (Naohisa), dated Nov. 21, 1995.
Patent Abstracts of Japan No. 61–247166 (Tomonori), dated Nov. 4, 1986.

*Primary Examiner*—Shawn Riley
*Attorney, Agent, or Firm*—Herbert L. Lerner; Laurence A. Greenberg

[57] ABSTRACT

A switched-mode power supply includes a circuit device with which a primary side is fed by a significantly reduced rectified voltage derived from the AC mains power supply voltage, during a standby operating mode. A phase gating control configuration, a capacitive voltage divider or a step-down controller are preferably used therefor. Power consumption in the standby operating mode is reduced approximately in proportion to the square of the primary-voltage reduction factor.

9 Claims, 1 Drawing Sheet

(a)　　　(b)

SWITCHED-MODE POWER SUPPLY WITH LOW POWER LOSS STANDBY OPERATION

CROSS-REFERENCE TO RELATED APPLICATION:

This application is a continuation of copending International Application No. PCT/DE96/02416, filed Dec. 16, 1996, which designated the United States.

BACKGROUND OF THE INVENTION

Field of the Invention

The invention relates to a switched-mode power supply including a transformer which is cyclically supplied with a rectified voltage on the input side and serves for supplying a load on the output side.

Switched-mode power supplies for supplying electronic devices have a normal operating mode and in addition a so-called standby operating mode in which the load to be supplied with energy is significantly smaller as compared with the normal operating mode. The power consumption of the device is intended to be as low as possible during the standby operating mode. However, the intrinsic power loss of conventional switched-mode power supplies in the standby operating mode is relatively high as compared with the useful power that is tapped off. The efficiency is accordingly low.

SUMMARY OF THE INVENTION

It is accordingly an object of the invention to provide a switched-mode power supply with low power loss standby operation, which overcomes the hereinafore-mentioned disadvantages of the heretofore-known devices of this general type.

With the foregoing and other objects in view there is provided, in accordance with the invention, a switched-mode power supply, comprising a transformer having an input side cyclically supplied with a rectified voltage and an output side for supplying a load; and a device for generating the rectified voltage from an AC voltage, the rectified voltage having a first value in a first operating state for a high load to be supplied by the transformer and a second, lower value in a second operating state for a low load to be supplied by the transformer.

In accordance with another feature of the invention, there is provided a smoothing capacitor providing the rectified voltage, and a device for charging the smoothing capacitor only during first phase portions containing a voltage zero crossing of the AC voltage during the first operating state and not charging the smoothing capacitor during second phase portions.

In accordance with a further feature of the invention, there is provided a smoothing capacitor providing the rectified voltage; terminals for the AC voltage; a first path connecting the smoothing capacitor to the terminals for the AC voltage, the first path containing a switching device controlled by a signal indicating the operating state, and a first rectifier having an input side connected through the switching device to the terminals for the AC voltage and an output side connected to the smoothing capacitor; and a second path connecting the smoothing capacitor to the terminals for the AC voltage, the second path containing a second rectifier and a phase gating control configuration.

In accordance with an added feature of the invention, there is provided a smoothing capacitor providing the rectified voltage; terminals for the AC voltage; a switching device controlled by a signal indicating the operating state; a first rectifier having an input side connected through the switching device to the terminals for the AC voltage and an output side connected to the smoothing capacitor; a device for capacitive voltage division; and a second rectifier having an input side connected through the device for capacitive voltage division to the terminals for the AC voltage and an output side connected to the smoothing capacitor.

In accordance with an additional feature of the invention, the second rectifier is a bridge rectifier having AC voltage terminals fed by the AC voltage through respective capacitors.

In accordance with yet another feature of the invention, the transformer has a first secondary winding to be connected to the load, and a second secondary winding; a control device is supplied by the second secondary winding during the first operating state, the control device controlling a changeover between the operating states as a function of the load to be supplied; and a changeover device switches over a voltage supply of the control device to the first secondary winding during the second operating state.

In accordance with yet a further feature of the invention, the control device includes a receiver and command decoder for a remote control.

In accordance with a concomitant feature of the invention, one of the secondary windings supplies a regulating signal coupled to an output voltage to be regulated in the first operating state; and the control device generates a signal for the changeover to the second operating state, the signal additively superposed on the regulating signal.

According to the invention, the switched-mode power supply is supplied on the primary side with a significantly lower voltage during the standby operating mode than during the normal operating mode. The dissipated power decreases with the square of this voltage ratio. At a customary mains power supply voltage of 230 V, the voltage to be converted which is present across the smoothing capacitor of the switched-mode power supply is about 325 V, corresponding to the peak value of the AC voltage. A reduction of the charging voltage of the smoothing capacitor to from 12 to 16 V is possible in the standby operating mode. This corresponds to a reduction factor of about 20. The dissipated power is then reduced by a factor of 400. The power loss also decreases in a corresponding manner since it is coupled to the dissipated power. The power loss is essentially caused by switching losses in a switching transistor.

In accordance with a first embodiment of the invention, it is possible to generate the low voltage for the standby operating mode through the use of a phase gating control configuration which is dimensioned in such a way that it delivers current to the smoothing capacitor only in the region of the zero crossing of the input-side AC mains power supply voltage. In accordance with a second embodiment of the invention, the low voltage can be obtained by capacitive voltage division from the AC mains power supply voltage and subsequent rectification. Capacitive division of the AC mains power supply voltage is possible since the dissipated power is low during the standby operating mode. According to a third embodiment, the low voltage is provided by a conventional step-down controller. During the standby operating mode, the feeding of the smoothing capacitor from the AC mains power supply voltage is switched off through the use of a corresponding switching element.

In order to obtain a further reduction in the power loss, it is advantageous to decrease the DC voltages produced on the secondary side by the switched-mode power supply in accordance with the low voltage on the primary side. Therefore, circuit measures are provided on the secondary side, through which the supply voltage of a control device which ensures the change-over between the standby operating mode and the normal operating mode, for example a remote control receiver, is supported during the standby operating mode. In the exemplary embodiments, this is realized by a changeover device by which the supply voltage of the control device is switched over during the standby operating mode to a winding which, during the normal operating mode, is provided for supplying other functional units and therefore emits a significantly higher voltage during the normal operating mode than during the standby operating mode. Overall, the circuit measures described can be combined with previous switched-mode power supply structures without a relatively large additional outlay for components. In particular, the circuitry realizations are integrable, for example together with an integrated regulating circuit which is present in any case for regulating the switched-mode power supply.

Other features which are considered as characteristic for the invention are set forth in the appended claims.

Although the invention is illustrated and described herein as embodied in a switched-mode power supply with low power loss standby operation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

For the sake of clarity, only those elements of a switched-mode power supply which are essential in connection with the invention are included. A concrete circuit structure can be realized, for example, with the integrated control circuit TDA 4605 from Siemens, by supplementing its external circuitry accordingly.

DESCRIPTION OF THE PREFERRED EMBODIMENTS

Figure 1:
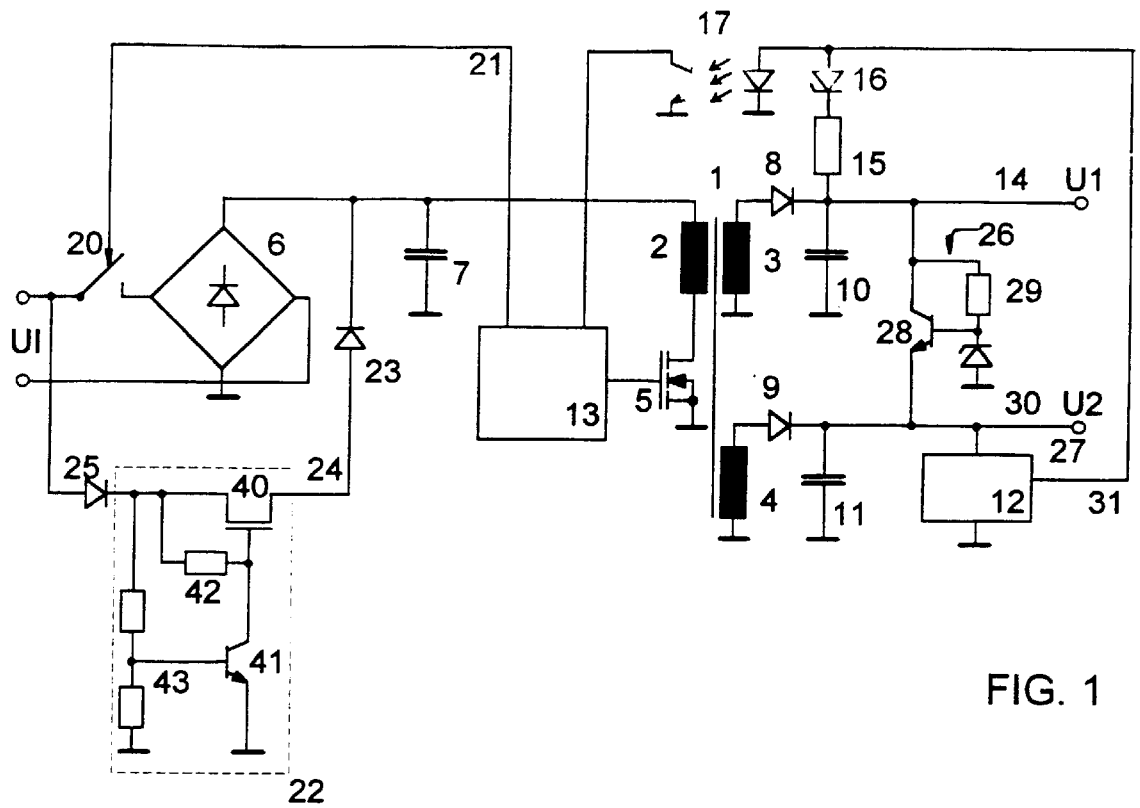
FIG. 1 is a basic schematic and block circuit diagram of a switched-mode power supply in accordance with a first embodiment of the invention.

Referring now to the figures of the drawings in detail and first, particularly, to FIG. 1 thereof, there is seen a switched-mode power supply which contains a transformer 1 having a primary winding 2, a first secondary winding 3 and a second secondary winding 4. An input-side AC mains power supply voltage UI is rectified through the use of a bridge rectifier 6 and smoothed through the use of a smoothing capacitor 7. A switching transistor 5 which is connected in series with the primary winding 2 can cyclically apply the AC mains power supply voltage UI to the primary winding 2. DC voltages U1 and U2 are present on the secondary side in each case after rectification through the use of respective rectifier diodes 8 and 9 and respective smoothing capacitors 10 and 11. In a normal operating mode, the switched-mode power supply is used to supply an electrical device, for example a television set. Essential functional units of a television set are supplied by the voltage U1, which is 150 V, for example. The voltage U2 serves to supply a control device 12 during the normal operating mode. The control device 12 is a remote control receiver, for example, which also includes a command decoder. The remote control receiver receives pulses which are emitted by a remote control unit, decodes the pulses and generates corresponding control signals. In particular, the control device 12 receives operational signals for a changeover between standby operating mode and normal operating mode. A regulating signal is derived from the voltage U1 and fed back to a primary-side control device 13. The latter controls switch-on and switch-off phases of the switching element 5, for example a switching transistor, in such a way that the output voltage U1 is constant independently of the load. For this purpose, a terminal 14 for the voltage U1 is fed back into the control device 13 through a current limiting resistor 15, a Zener diode 16 and an optocoupler 17 for coupling to the primary side. A regulation threshold for the voltage U1 is formed by the Zener diode 16, which has a Zener voltage of 150 V in the example described. The functional units supplied by the voltage U1 are disconnected in the standby operating mode. On the secondary side, essentially only the remote control receiver and the decoder 12 then need to be supplied with energy. In this respect, the switched-mode power supply shown in FIG. 1 corresponds to the prior art.

According to the invention, a switch 20 is provided for the changeover to the standby operating mode. The switch 20 interrupts the feeding of the AC mains power supply voltage to the bridge rectifier 6. The switch 20 is controlled by a control signal output by the control device 13 over a line 21. The control device 13 activates the line 21 when low-load operation, that is to say standby operating mode, is present. The smoothing capacitor 7 does not then continue to be recharged from the bridge rectifier 6. The voltage present across it decreases until the recharging of the smoothing capacitor 7 is taken over by a low-voltage supply 22. A diode 23 prevents the smoothing capacitor 7 from being discharged by the device 22 in the normal operating mode.

The device 22 contains a phase gating control configuration in the exemplary embodiment illustrated in FIG. 1. As is known, a phase gating control configuration delivers a current only during a specific phase of an AC voltage. The phase gating control configuration 22 is set in such a way that a voltage is available at its output 24 only for phase portions lying in the region of the zero crossing of the input-side AC mains power supply voltage. The voltage at the output recharges the capacitor 7 provided that the charging voltage thereof is below the voltage available at the terminal 24. The AC mains power supply voltage UI is made available to the phase gating control configuration 22 after having been rectified through a diode 25. Instead of the half-wave rectification shown in FIG. 1, it is also possible to provide a bridge rectifier of appropriate complexity. In the latter case, the active phase of the phase gating control configuration 22 contains the zero crossing of the AC mains power supply voltage UI in its center, and at the edge of the conductivity phase in the former case.

The effect achieved by the circuit according to the invention is that during the standby operating mode, the smoothing capacitor 7 is recharged only by the voltage delivered by the phase gating control configuration 22. The voltage of the smoothing capacitor 7 is then charged approximately to the maximum voltage delivered by device 22 during a conductivity portion. The conductivity phase of the device 22 is expediently switched off within a sinusoidal oscillation of the input-side AC mains power supply voltage UI when an instantaneous voltage value of 12 to 16 V is reached. Thus, the primary winding 2 of the switched-mode power supply transformer 1 is then supplied only with 12 to 16 V during the standby operating mode. The primary current flowing through the primary winding 2 and the switching transistor 5 decreases (given identical switching times in comparison with the normal operating mode) by the factor of the voltage reduction. The dissipated power decreases by the square of this factor. Since the switching losses in the switching transistor 5 are essential to the intrinsic power loss of the switched-mode power supply in the standby operating mode, the intrinsic power loss of the switched-mode power supply is reduced correspondingly.

The secondary voltages U1, U2 decrease in a manner corresponding to the factor of the primary-side voltage reduction. The voltage U2 no longer suffices to supply the control device 12 sufficiently with energy. The voltage U2 is therefore supported by the voltage U1 in the standby operating mode. For this purpose, a changeover switch 26 is provided for connecting a terminal 27 for the voltage U2 to the terminal 14 during the standby operating mode. The changeover switch 26 preferably contains a transistor 28, having a base which is connected to its collector through a resistor 29 and to a secondary ground through a Zener diode 30. If the voltage U2 at an emitter of the transistor 28 falls below a threshold defined by the Zener diode 30, the transistor 28 is turned on. The voltage U2 is then supported by the voltage U1. In the normal operating mode, the voltage U2 is at least large enough to ensure that the transistor 28 just remains switched off.

The control device 12 generates a signal at its output 31 which is fed into the optocoupler 17 for the changeover from the normal operating mode to the standby operating mode. In this case, the signal is additively superposed on the regulating voltage drawn from the terminal 14 through the resistor 15 and the Zener diode 16. An excessively high secondary voltage, which is actually not present, is thereby indicated to the control device 13. The control device 13 contains a timing element, preferably an integrator, which decides that a changeover is made to the standby operating mode, if this state persists for a relatively long period of time. The control device 13 then activates the signal at the terminal 21 for opening the switch 20 and disconnecting the bridge rectifier 6. If the emitter voltage of the transistor 28 falls below the threshold voltage of the diode 30, the voltage U2 can be regulated by interrogating the voltage U1 in the device 12 and generating a corresponding control signal at the output 31 of the control device 12. The signal at the terminal 31 is switched off for the changeover to the normal operating mode, with the result that the output voltages are again regulated through the Zener diode 16. The control circuit 13 then initially moves to the upper power limit in the low-voltage standby operating mode. If the control device 13 ascertains that the voltage U1 is lying below the desired value, after a specific time limit defined in the control device 13 has been exceeded, the signal at the terminal 21 is switched off and the switch 20 is closed again. The result is that the switched-mode power supply overall changes over to the normal operating mode.

Any control configuration which implements the function specified above can be used as the phase gating control configuration 22. The phase gating control configuration advantageously contains a MOS transistor 40, having a drain-source path which is connected between the diodes 25 and 23. A gate terminal of the transistor 40 is connected through a transistor 41 to ground. The transistor 41 is driven at its base by a voltage divider 43, by which the voltage present on the input side of the phase gating control configuration is interrogated. In addition, a pull-up resistor 42 connected to the input side of the phase gating control configuration is provided at the gate terminal of the transistor 40. If the voltage present at the input side of the phase gating control configuration lies above the switching threshold formed by the transistor 41, the gate of the transistor 40 is pulled to ground and the output 24 of the phase gating control configuration 22 is switched off. If the voltage present at the base of the transistor 41 through the voltage divider 43 does not suffice to turn on the transistor 41, the transistor 40 is turned on through the pull-up resistor 42 and passes on the AC mains power supply voltage, rectified through the diode 25, to terminal 24.

Generation of the primary-side low voltage for the standby operating mode through the use of capacitive voltage division is shown in FIGS. 2a and 2b. In a first structural alternative in accordance with FIG. 2a, a terminal of the primary-side AC voltage UI is connected to primary ground through a capacitive voltage divider 50, 51. A center tap of the voltage divider 50, 511 is fed through rectifier diodes 52, 53 to a smoothing capacitor 54, having an output voltage which is limited by a Zener diode 55. A tap 24 on the Zener diode 55 corresponds to the terminal 24 in FIG. 1 and serves, with the interposition of the diode 23, for connection to the smoothing capacitor 7. A circuit constructed similarly with the elements 50 to 53 can also be provided for the other terminal of the AC voltage for coupling into the capacitor 54.

According to another alternative for realization of the second exemplary embodiment in accordance with FIG. 2b, a bridge rectifier 60 is provided with AC voltage terminals connected through respective capacitors 61, 62 to the terminals for the primary-side AC voltage UI. A smoothing capacitor 63 and a voltage-limiting Zener diode 64, from which the terminal 24 is tapped, are again disposed at an output of the bridge rectifier 60. The capacitors 50, 51 and 61, 62 are realized as so-called X capacitors, which are otherwise used for interference suppression and filtering of perturbations of the switching frequency of the switched-mode power supply on the electricity supply system.

Figure 2:
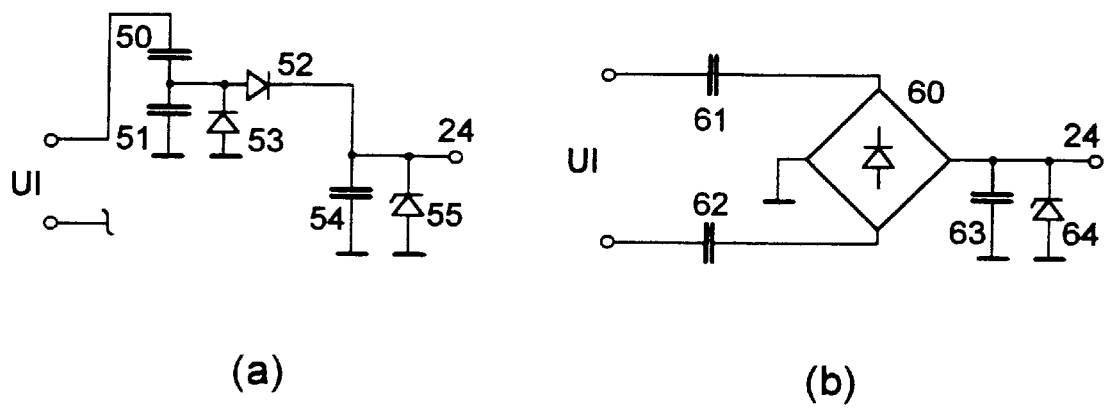
FIGS. 2a and 2b are circuit diagrams showing a second embodiment for generating a primary-side low voltage for a standby operating mode with two structural variants.

Instead of the phase gating control configuration 22 or the capacitive voltage division shown in FIG. 2, it is also possible to use a so-called step-down controller for generating a low voltage at the terminal 24. A step-down controller generates a reduced voltage from the input-side AC mains power supply voltage UI by cyclic application of this voltage to an inductive element and subsequent smoothing. A basic circuit diagram for the realization of a step-down controller is described, for example, in the book by Tietze and Schenk entitled: "Halbleiter-Schaltungstechnik", [Semiconductor circuitry], 9th edition, 1991, page 563, FIG. 18, 34 and page 564, FIG. 18, 37.

I claim:
1. A switched-mode power supply, comprising:
a transformer having a primary side cyclically supplied with a rectified voltage and a secondary side for supplying a load; and
a device for generating the rectified voltage on said primary side of said transformer from an AC voltage, the rectified voltage having a first voltage value in a first operating state for a high load to be supplied by said transformer and a second, lower voltage value in a second operating state for a low load to be supplied by said transformer.

2. The switched-mode power supply according to claim 1, including a smoothing capacitor providing the rectified voltage, and a device for charging said smoothing capacitor only during first phase portions containing a voltage zero crossing of the AC voltage during said first operating state and not charging said smoothing capacitor during second phase portions.

3. The switched-mode power supply according to claim 1, including:

a smoothing capacitor providing the rectified voltage;

terminals for the AC voltage;

a first path connecting said smoothing capacitor to said terminals for the AC voltage, said first path containing a switching device controlled by a signal indicating said operating state, and a first rectifier having an input side connected through said switching device to said terminals for the AC voltage and an output side connected to said smoothing capacitor; and a second path connecting said smoothing capacitor to said terminals for the AC voltage, said second path containing a second rectifier and a phase gating control configuration.

4. The switched-mode power supply according to claim 1, including:

a smoothing capacitor providing the rectified voltage;

terminals for the AC voltage;

a switching device controlled by a signal indicating said operating state;

a first rectifier having an input side connected through said switching device to said terminals for the AC voltage and an output side connected to said smoothing capacitor;

a device for capacitive voltage division; and a second rectifier having an input side connected through said device for capacitive voltage division to said terminals for the AC voltage and an output side connected to said smoothing capacitor.

5. The switched-mode power supply according to claim 4, wherein said second rectifier is a bridge rectifier having AC voltage terminals fed by the AC voltage through respective capacitors.

6. The switched-mode power supply according to claim 1, wherein:

said transformer has a first secondary winding to be connected to the load, and a second secondary winding;

a control device is supplied by said second secondary winding during said first operating state, said control device controlling a changeover between said operating states as a function of the load to be supplied; and a changeover device switches over a voltage supply of said control device to said first secondary winding during said second operating state.

7. The switched-mode power supply according to claim 6, wherein said control device includes a receiver and command decoder for a remote control.

8. The switched-mode power supply according to claim 6, wherein:

one of said secondary windings supplies a regulating signal coupled to an output voltage to be regulated in said first operating state; and said control device generates a signal for the changeover to said second operating state, the signal additively superposed on the regulating signal.

9. The switched-mode power supply according to claim 7, wherein:

one of said secondary windings supplies a regulating signal coupled to an output voltage to be regulated in said first operating state; and said control device generates a signal for the changeover to said second operating state, the signal additively superposed on the regulating signal.

* * * * *

UNITED STATES PATENT AND TRADEMARK OFFICE
CERTIFICATE OF CORRECTION

PATENT NO : 5,995,388
DATED : November 30, 1999
INVENTOR(S) : Peter Preller

It is certified that error appears in the above-identified patent and that said Letters Patent is hereby corrected as shown below:

Title page,
Item [30] should read as follows:

Jan. 12, 1996    [DE]   Germany .......... 196 00 962.6

Signed and Sealed this

Fourteenth Day of November, 2000

Attest:

Q. TODD DICKINSON

Attesting Officer

Director of Patents and Trademarks